United States Patent

Haider et al.

[11] Patent Number: 5,709,740
[45] Date of Patent: Jan. 20, 1998

[54] THERMALLY EXPANDABLE, VISCOSITY MODIFIED WAX COMPOSITIONS AND METHOD OF USE IN ACTUATORS

[75] Inventors: M. Ishaq Haider, Bernardsville; James E. Kuder, Fanwood; Barbara J. Long, Linden; Joseph D. Menczel, Somerset; James B. Stamatoff, Westfield, all of N.J.; Michael Bayer, Langweid, Germany

[73] Assignee: Hoechst Celanese Corp., Somerville, N.J.

[21] Appl. No.: 606,111

[22] Filed: Feb. 23, 1996

[51] Int. Cl.$^6$ ............... C08L 91/06; H01B 1/22; H01B 1/24
[52] U.S. Cl. ............... 106/272; 524/277; 524/763; 252/511; 252/512; 208/21; 204/167
[58] Field of Search ............... 252/510, 511, 252/512, 518; 106/272; 524/277, 763; 208/21; 204/167

[56] References Cited

U.S. PATENT DOCUMENTS

| | | | |
|---|---|---|---|
| 3,321,426 | 5/1967 | Dorsey | 106/272 |
| 3,321,427 | 5/1967 | Tyran | 524/277 |
| 3,417,040 | 12/1968 | Kremer | 524/277 |
| 3,639,166 | 2/1972 | Fellows et al. | 428/327 |
| 3,925,219 | 12/1975 | Strong | 430/109 |
| 4,100,087 | 7/1978 | Takayama et al. | 430/106.6 |
| 4,239,546 | 12/1980 | Russel et al. | 106/270 |
| 4,909,960 | 3/1990 | Watanabe et al. | 252/511 |
| 5,417,756 | 5/1995 | Bayer et al. | 106/272 |

*Primary Examiner*—Paul Lieberman
*Assistant Examiner*—M. Kopec
*Attorney, Agent, or Firm*—John M. Genova

[57] ABSTRACT

A thermally expandable wax composition and its use in polymer-based actuators is disclosed and claimed. The compositions are wax-based and include conductive filler as well as a viscosity modifier to stabilize the composition against segregation. Optionally included are thermoxidative stabilizers.

12 Claims, 1 Drawing Sheet

THERMALLY EXPANDABLE, VISCOSITY MODIFIED WAX COMPOSITIONS AND METHOD OF USE IN ACTUATORS

TECHNICAL FIELD

The present invention relates generally to wax compositions for use as expandable media in actuators, and more particularly to such materials including a conductive filler and a viscosity modifier to increase the viscosity of the mixture in the melt.

BACKGROUND

Thermally operated actuators utilizing wax compositions as the expandable medium are known in the art, and used in thermostats, for example. Waxes are particularly suitable for use in actuators because they exhibit a relatively large amount of expansion as they are heated and melt to the liquid phase as the temperature is raised. Long-chain waxes may exhibit a volume change upon melting of more than 10 and even close to 20 volume percent. Another advantage of using waxes is that their melting temperature can be tailored, if so desired, by utilizing a wax of a particular molecular weight. A still further advantage of waxes is that their rate of crystallization from the melt and re-crystallization may be relatively fast as compared to other materials, such as high polymers.

It is desirable to increase thermal conductivity of waxes in thermal actuator applications to facilitate heat transfer and ultimately cycle time of the actuator device. To this end, it is known in the art to add 10, up to 30 and even 50 weight percent of a conductive filler, such as copper spheres and the like. The addition of conductive material does increase the thermal conductivity of the wax-based medium; however, like any heterogeneous system, non-uniformities can arise through particle segregation or stratification and like phenomena. This leads to erratic performance which is likely to become more severe as the amount of filler is increased or the density difference (and consequently the buoyant forces) become more pronounced.

SUMMARY

It has been found in accordance with the present invention, that a better performing wax composition for actuator use is produced through adding a viscosity modifier to increase the viscosity of the wax matrix material in the melt. More specifically, a thermally expandable wax composition for use in actuators is provided including: a wax matrix material in a proportion of about 20 to about 90 percent by weight of said composition; a polymeric viscosity modifier having a melt index of less than about 30 present in an amount of about 0.5 to about 30 weight percent of the wax composition and being operative in said proportions to increase the melt viscosity of said wax matrix material by a factor of at least 100 and up to a factor of $10^6$ as compared to the viscosity of unmodified wax matrix material, the increase being measured at a temperature of about 120° C., with the proviso that the weight ratio of said wax matrix material to said polymeric viscosity modifier is from about 5:1 to about 99:1. There is also present, a conductive filler present in an amount of from about 10 weight percent to about 50 weight percent of said composition and optionally including a thermoxidative stabilizer.

Particularly preferred viscosity modifiers are relatively high molecular weight olefin polymers including poly (ethylene), poly(propylene) and especially poly(ethylene-co-vinyl acetate). Less than 20 mole percent vinyl acetate polymers have been found especially effective. Typically, these modifiers are included in the inventive compositions in amounts from about 1 to about 15 weight percent, with from 2-10 percent being preferred. The modifiers are generally effective to increase the viscosity of melted wax by a factor of 100 or more to a factor of $10^6$ or even more, but factors of about $10^3$ to $10^5$ are more typical. Melt index is a particularly convenient method to characterize the polymeric viscosity modifiers of the present invention. Unless otherwise indicated, all values of melt index appearing in this specification and claims are those measured in accordance with test method ASTM D-1238, Procedure A, Condition E, that is, at a temperature of 190° C. with a weight of 2.16 kilograms. Generally, the polymeric viscosity modifiers exhibit a melt index of less than 30, less than 10 being typical and less than 5 being particularly preferred.

Conductive fillers useful in connection with the present invention include copper flake, aluminum flake and certain forms of carbon such as, for example, graphitic fillers.

Any suitable graphite filler may be used, however, flake, powder and fibers are typical. Spherical powder is especially preferred.

Particularly preferred thermoxidative stabilizers are selected from the group consisting of hydroxycinnamates, phosphites, pentaerythritol diphosphites and hindered phenols.

The present invention has as its basic and novel characteristics the fact that wax, viscosity modifier, and graphitic filler cooperate to provide a highly stable thermally expandable composition which resists segregation over time. Other materials, such as thermoxidative stabilizers may be added to make a more durable material without departing from the spirit and scope of the present invention.

In another aspect of the present invention, the inventive compositions are used in a mechanical actuator and may be heated directly with an electric current.

DESCRIPTION OF DRAWING

The invention is described in detail below, with reference to the single FIG. 1, which is a schematic diagram of a polymer-based mechanical actuator.

DETAILED DESCRIPTION

Figure 1A:
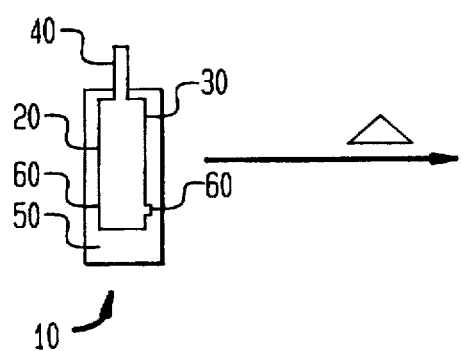

Wax, as the term is used herein, refers to those materials which are solid materials at ambient temperatures with a relatively low melting point and are capable of softening when heated and hardening when cooled. They are either natural or synthetic and of petroleum, mineral, vegetable or animal origin. Typical of petroleum waxes are paraffin waxes and microcrystalline waxes. The latter consisting primarily of isoparaffinic and naphthenic saturated hydrocarbons, while the former are generally composed of n-alkanes. Beeswax, on the other hand, is primarily made of non-glyceride esters of carboxylic and hydroxy acids with some free carboxylic acids, hydrocarbons and wax alcohols present. The most important commercial mineral wax, montan wax, has as its main components nonglyceride esters of carboxylic acids, alcohols, acids, resins and hydrocarbons. Vegetable-based waxes tend to have relatively large amounts of hydrocarbons. Esters and amides of higher fatty acids are also waxy materials and may be used in connection with the present invention. The foregoing waxes generally have molecular weights less than 1,000; while polyethylene waxes generally have higher molecular weights in the range of 2,000 to less than 10,000.

Hoechst Wax E, commercially available from Hoechst AG, Frankfurt, Germany, is a reprocessed montan wax esterified with higher alcohols and has a melting point of approximately 90° C. Hoechst WAX PED-521 is a polar polyethylene wax also available from Hoechst AG which has a melting point slightly higher, perhaps 100° C. or more.

Conductive fillers useful in connection with the present invention include those which conduct electricity as well as those which conduct heat readily. Particularly suitable fillers are graphitic fillers such as fibers or spherical powders as well as aluminum or copper powders or flakes having a relatively high surface area. Graphite fiber may be obtained from Amoco Corporation, Chicago, Ill., while the other fillers referred to herein are generally available.

Suitable polymeric viscosity modifiers to add to the wax include relatively high molecular weights >10,000 and more typically >50,000. Polyethylenes with molecular weights of 200,000 or more may be suitable, even ultra high density material with molecular weights from 3 to 6 million may be used. Polypropylene of like molecular weights may likewise be employed.

Especially suitable polymeric viscosity modifiers are poly (ethylene-co-vinyl acetate) polymers having melt indices of 30 or less. These materials are available from dupont, Wilmington, Del. and are marketed under the Elvax® trademark. Particularly preferred Elvax® products have a relatively low vinyl acetate content (about 20 mole percent or less) and have a melt index less than 5.

Antioxidants

It is desirable to include antioxidants in the formulation of the actuating material to inhibit oxidation and resultant degradative effects. Such antioxidants are commercially available and include such chemical species as amines, phenols, hindered phenols, phosphites, sulfides, and metal salts of dithioacids. It is further known when carbon black is compounded with organic resins that this can inhibit degradation of the polymer. The presence of two or more antioxidant additives can provide synergistic benefit against degradation of the base resin. Examples of increased stability achieved by the addition of such additives are shown below. Thermogravimetric analysis (TGA) showed significantly reduced loss in weight of samples containing antioxidants when these combinations were heated in air at 200° C. and at 225° C. These materials are available throughout the world from Ciba-Geigy and are generally marketed under the Irganox® trademark.

In a typical embodiment, a thermoxidative stabilizer such as tetrakis (methylene (3,5-di-tert-butyl-4-hydroxycinnamate)) methane and bis(2,4-di-tert-butylphenyl) pentaerythritol diphosphite may be included. Preferably, each stabilizer comprises about 0.1–0.5% by weight of the wax composition. Alternatively, the bis(2,4-di-tert-butylphenyl) pentaerythritol diphosphite may be replaced by 0.1–0.5% diestearyl pentaerythritol diphosphite.

The present invention may be further appreciated from the following notion of resistance to flow in a fluid: For a suspension of spherical particles in a fluid medium, the terminal sedimentation velocity is given by $$\frac{dx}{dt} = \frac{2r^2(\rho - \rho_0)g}{9\eta}$$

where r is the radius of the particle $\rho$ and $\rho_0$ are the densities of the particle and the surrounding fluid respectively, g is the acceleration due to gravity, and $\eta$ is the viscosity of the fluid. In other words, the rate at which suspended particles separate from the suspension can be minimized by reducing the size of the particle, matching the density of the particle to that of the fluid, or increasing the viscosity of the fluid. So also, flaked material has more surface area and tends not to segregate.

The addition of ethylene-vinyl acetate copolymers (e.g., Elvax® from dupont) may be used conveniently to increase the melt viscosity of Hoechst Wax E.

| Wax Sample | Melt Viscosity (poise) |
|---|---|
| Wax E | $2.54 \times 10^{-1}$ |
| Wax E with 15% Elvax | $7.75 \times 10^3$ |

Thus the addition of only 15% viscosity enhancer results in an increase of more than four orders of magnitude in the melt viscosity of the base wax. It is desirable to keep the percentage of additives as low as possible so as not to lose the volume expansion which occurs upon melting of the wax.

The following data demonstrating the increased viscosity of Hoechst Montan Wax E and PED-521 polar polyethylene containing Elvax 770 (An ethylene-vinyl acetate copolymer) is likewise illustrative of the effect of the modifier on the matrix wax.

| VISCOSITY OF WAX E AND PED-521 WITH ELVAX 770 (TEST TEMPERATURE = 120° C.) | | |
|---|---|---|
| Wax Sample | Average Viscosity (Poise) | Viscosity Increase due to Additive (%) |
| Wax E | $2.60 \times 10^{-1}$ | N/A |
| Wax E #2 | $2.48 \times 10^{-1}$ | N/A |
| Wax E w/15% Elvax 770 | $7.75 \times 10^3$ | $3 \times 10^4$ |
| PED-521 | 2.53 | N/A |
| PED-521 #2 | 2.22 | N/A |
| PED-521 w/15% Elvax 770 | $1.22 \times 10^3$ | $5 \times 10^2$ |

Note: Elvax ® 770 typically has a melt index of 0.6 to 1.0.

The following process was used to prepare wax samples containing:

(a) Conductive additives such as graphite powder, fiber and flakes (b) Thermal stabilizers such as Irganox 1010 and Irganox 1425 (Ciba Geigy)

(c) Viscosity modifier such as ELVAX 770 (duPont). The process description given below further illustrates the present invention.

Process Description

In a batch process (1000 ml beaker), 188 g of Hoechst Wax E, 10 g of ELVAX 770, 1 g of Irganox 1010 and 1 g of Irganox 1425 were slowly heated under constant agitation for approximately 3 to 4 hours at 140° C. After making a clear solution (of ELVAX, Irganox and wax), the mixture was cooled to room temperature and removed as brownish wax product referred to as Stabilized Wax. The final composition of this mixture was: 94 wt % Hoechst Wax E, 5 wt % ELVAX 770, 0.5 wt % Irganox 1010 and 0.5 wt % Irganox 1425. After grinding into fine powder, the product was used for subsequent melt blending with conductive additives.

Melt blending of the Stabilized Wax with graphite powder was performed in a Haake System 90 Melt Mixer. The blend mixture was prepared by introducing 70 g of a sample consisting of 35 wt % graphite powder and 65 wt % Stabilized Wax into the mixing bowl which was preheated to 120° C. The blending was completed by continuous mixing of the melt at 200 RPM for approximately 15 minutes. After cooling, the material was ground and evaluated for particle distribution by microscopy.

Graphite fiber such as P-120 (Amoco) and GY-70 graphite fiber produced at Hoechst Celanese was also evaluated as a conductive additive. Using the same blending system, P-120 was evaluated with Stabilized Wax (same formulation as above) at 7 wt % and 20 wt %. GY-70 was tested at 5 weight percent.

Additive Sources

Graphite Powder: High Purity Crystalline Graphite, Series 4900 from Superior Graphite Company, 120 South Riverside Plaza, Chicago, Ill. 60606. The copper and aluminum powders have a grain size less than about 20 µm and may be flaky or spheric. They are commercially available from Schlenk Gmbh, Erlangen, Germany, under the trade names MULTIPRINT or LUMINOR.

Viscosity Modifier: ELVAX 770 Resin from dupont Company, Polymer Products Department, Wilmington, Del. 19898

Figure 1B:
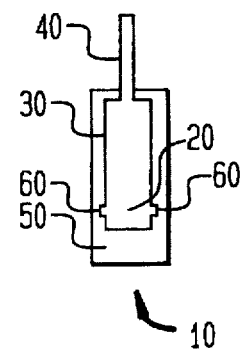

The invention is further understood by reference to FIG. 1, a schematic of a polymer based mechanical actuator. In general, this type of actuator 10 includes a cavity 20 wherein there is placed a thermally expandable composition 30 which in turn contacts a movable piston 40. In FIG. 1(a), the thermally expandable composition, a wax composition in the case of the present invention, is in solid form in contact with the piston. Heat is applied by any suitable means and as the wax melts, composition 30 expands on the order of twenty volume percent and occupies more of cavity 20, forcing piston 40 upwardly out of the cavity as shown in FIG. 1(b).

Typically, heating is accomplished by external heating means; however since the compositions of the present invention are electrically conductive, heating may be accomplished through direct application of current through the expandable compositions. To this end, the actuator body 50 may be made of an insulative material and produced with electrodes 60 to contact the polymer composition 30. Typically, this may be accomplished with a voltage source (not shown) of 12 volts provided that sufficient current is conducted through composition 30. One may use the above described heating method as the sole heating means; or use this heating means as supplemental to conventional apparatus.

While the present invention has been described in detail, various modifications will be readily apparent to those of skill in the art. Such modifications are within the spirit and scope of the present invention which is defined in the appended claims.

We claim:

1. A thermally expandable wax composition for use in actuators consisting essentially of:
    (a) a wax matrix material in a proportion of about 20 to about 95 per cent by weight of said composition;
    (b) a polymeric viscosity modifier having a melt index of less than about 30 present in an amount of about 0.5 to about 30 weight percent of said composition and being operative in said proportions to increase the melt viscosity of said wax matrix material by a factor of at least 100 and up to a factor of $10^6$ as compared to the viscosity of unmodified wax matrix material, said increase being measured at a temperature of about 120° C., with the proviso that the weight ratio of said wax matrix material to said polymeric viscosity modifier is from about 5:1 to about 99:1;
    (c) a thermally conductive filler present in an amount of from 10 weight percent to about 50 weight percent of said composition; and
    (d) optionally including a thermoxidative stabilizer.

2. The composition according to claim 1, wherein said thermoxidative stabilizer is selected from the group consisting of hydroxycinnamates, pentaerythritol diphosphites and hindered phenols.

3. The composition according to claim 1, wherein said polymeric viscosity modifier is present in an amount of from about 1 to about 15 weight per cent.

4. The composition according to claim 3, wherein said polymeric viscosity modifier is present in an amount from about 2 to about 10 weight per cent.

5. The composition according to claim 1, wherein the polymeric viscosity modifier is operative to increase the viscosity of the wax by a factor of from about $10^3$ to about $10^5$.

6. The composition according to claim 1, wherein said viscosity modifier is selected from the group consisting of poly(ethylene) and poly(propylene).

7. The composition according to claim 1, wherein said viscosity modifier is poly(ethylene-co-vinyl acetate).

8. The composition according to claim 7, wherein the molar proportion of vinyl acetate monomer in said viscosity modifier is less than about 20 mole per cent.

9. The composition according to claim 1, wherein the melt index of said polymeric viscosity modifier is less than about 10.

10. The composition according to claim 1, wherein the melt index of said polymeric viscosity modifier is less than about 5.

11. The composition according to claim 1, wherein said conductive filler is selected from the group consisting of aluminum flake, copper flake, graphite fiber, graphite powder, and graphite flake.

12. The composition according to claim 11, wherein said conductive filler is spherical graphite powder.

* * * * *